Figure 1:
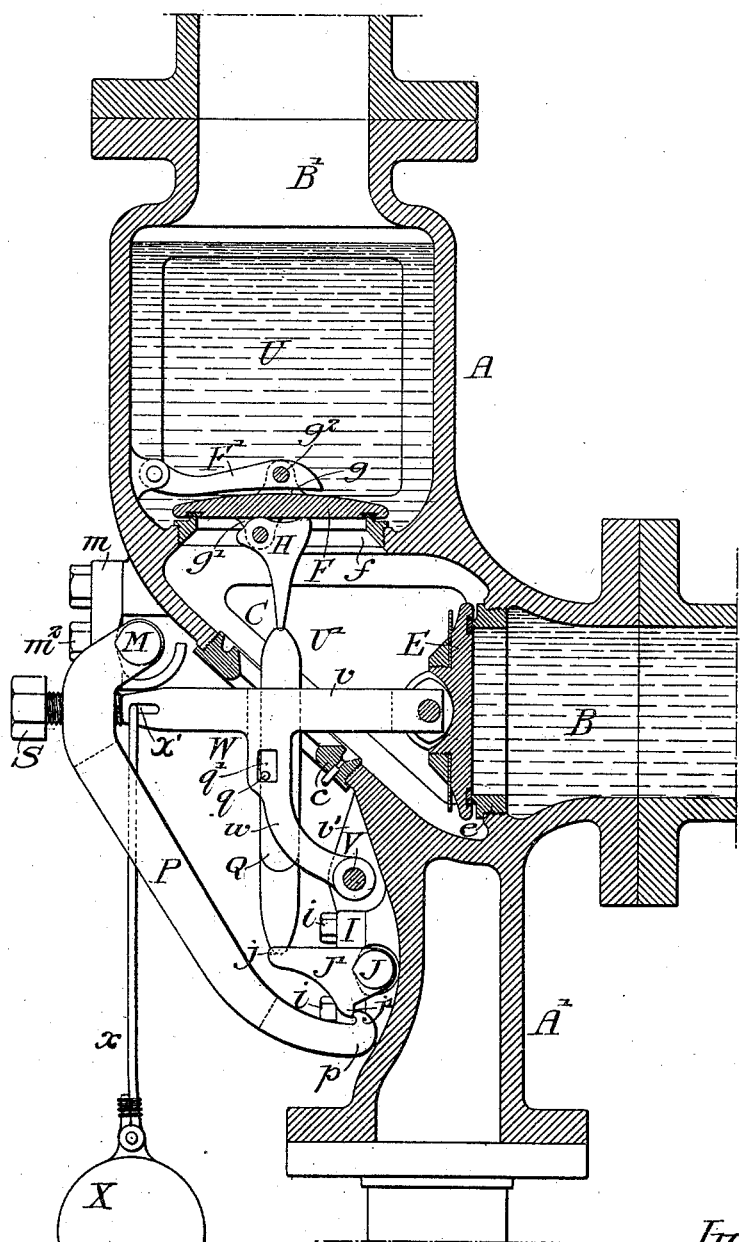

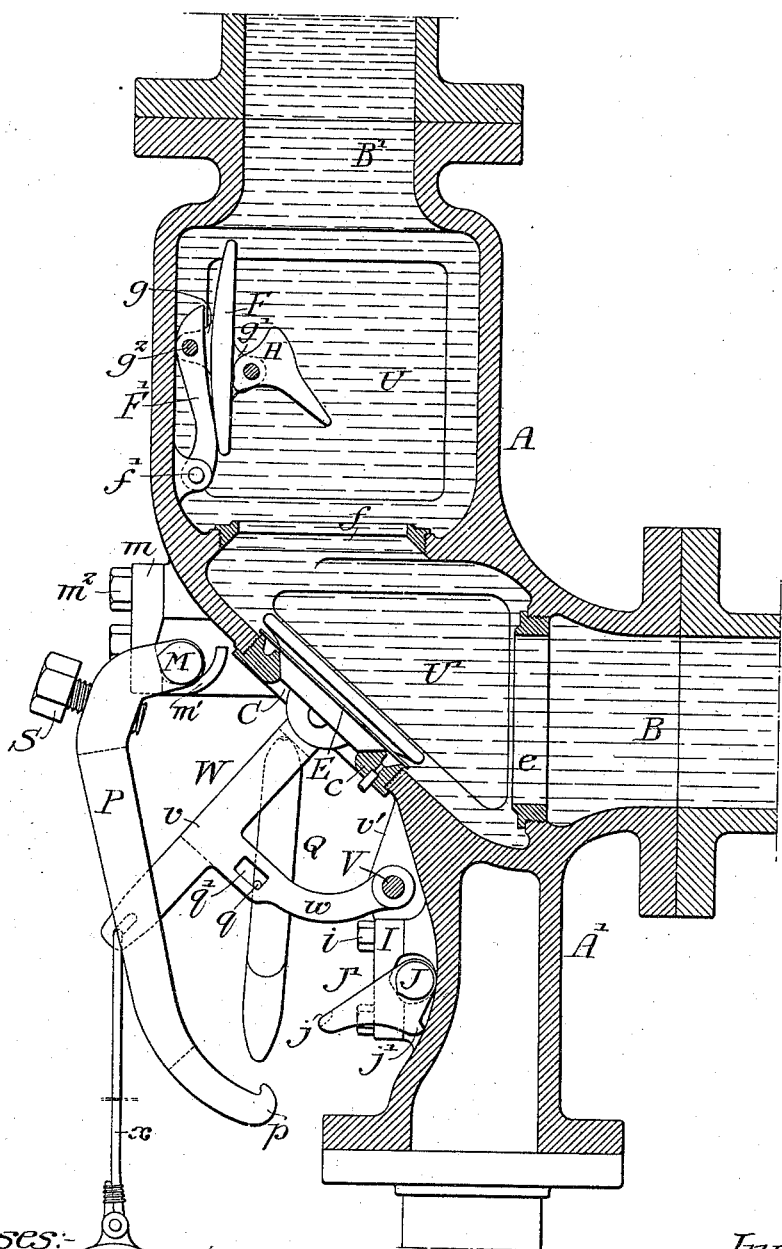

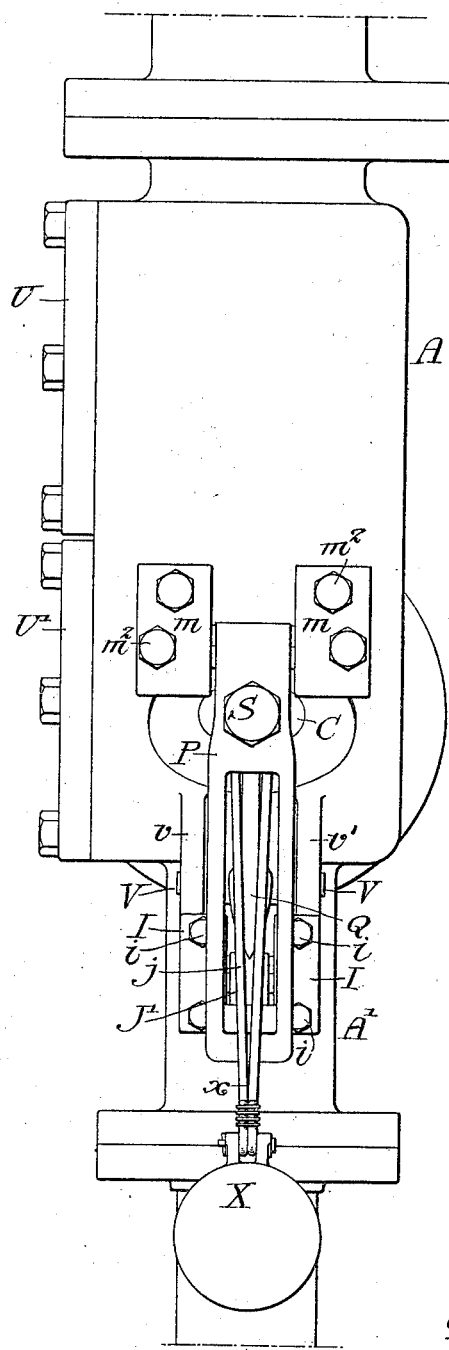

UNITED STATES PATENT OFFICE.

POWELL EVANS, OF PHILADELPHIA, PENNSYLVANIA.

DRY-PIPE VALVE.

SPECIFICATION forming part of Letters Patent No. 695,294, dated March 11, 1902.

Application filed December 13, 1900. Serial No. 39,743. (No model.)

*To all whom it may concern:*

Be it known that I, POWELL EVANS, a citizen of the United States, residing in Philadelphia, Pennsylvania, have invented certain Improvements in Dry-Pipe Valves, of which the following is a specification.

My invention relates to certain improvements in automatic valves, and more particularly to an improved form of valve for use in connection with what is known as the "dry-pipe fire-extinguishing system." It has for its object the simplification of the valve mechanism for automatically admitting water to the pipes of such a system when the pressure in the dry pipe falls below a certain predetermined point. This object I attain as hereinafter described, reference being had to the accompanying drawings, in which—

Figure 1 is a sectional view taken in the plane of the axes of the two sections of the valve, showing the various parts in the position which they occupy under normal circumstances. Fig. 2 is a similar view with the mechanism in the position which it occupies after the valve has opened and water is passing through it; and Fig. 3 is an outside end view of the valve, showing the arrangement and preferred design of the operating-levers.

In the drawings, A is the main valve-casing, having a supporting-base A' and flanged openings B and B'. A third opening C has fitted to it a valve-seat $c$, and at two other points within the valve-casing valve-seats $e$ and $f$ are fitted, dividing it into three chambers, the said valve-seats being preferably at right angles to the direction of the openings B, B, and C, respectively.

A valve E is constructed to fit the seat $e$, as shown in Fig. 1, and is made double-faced, for its back surface is constructed to fit the valve-seat $c$, as shown in Fig. 2. A lever W is pivoted to the back of the valve and may be described as consisting of a divided compression-piece $v$, held on projections or arms $w$, having one end loosely pinned to the valve E and the other slightly rounded to fit the hollowed end of a bolt S. This piece $v$ is supported by arms $w$, which are hung to the shaft V, being mounted in bearings in the ribs $v'v'$, projecting from the casing and having the weight X suspended from it by a flexible cord or chain $x$ near the outside end, preferably at the point $x'$. A second valve F, fitting the seat $f$, is connected by the arm F'' to a rod or shaft $f'$, which is supported in bearings in the main valve-casing, and there are lugs $g$ and a pin $g^2$ for the purpose of attaching said arm to the valve. On the under side of the valve F are lugs $g'$, to which is pivoted the piece H, having, preferably, a tripodal bearing against the valve F and being rounded at the point.

At a point on the casing A, preferably below the shaft or pin V, are a pair of knife-edge bearings I I, secured in place by bolts $i\,i$. Constructed to operate in these bearings is a shaft J, having knife-edges, there being a lever J' on said shaft. This lever is of the form shown in the figures, being formed with a depression $j$, V-shaped in section. The other arm of the lever is formed with a bearing edge $j'$, constructed to engage the hooked end of a lever P.

On the main casing A, at a point above the valve-opening C, are two knife-edge bearings $m\,m$, held in place by bolts $m^2$ and having operating in them the shaft M, with knife-edges, as shown. It will be noted that there are arms $m'\,m'$ projecting from the lower part of this bearing, which has no bottom. These arms serve to retain the shaft M in the said bearing when the parts of the valve occupy the positions indicated in Fig. 2. Hung to the shaft M is the slotted lever P, the end of which is hooked to engage the edge $j'$ of the lever J', as above described. An adjusting-bolt S fits a threaded hole through the upper part of the lever P, the end of said bolt being slightly hollowed to receive the end of the lever or bar W. The lever P has a slot in its body to accommodate the cord or chain $x$ for the support of the weight, the slot being made wide enough to allow free motion of the end of the lever W through it. A rod Q passes between the arms $w$ of the lever W and is loosely pivoted to them by a pin $q$, which rests loosely in the openings $q'$ in said arms. This rod Q has a depression in its upper end formed to fit the rounded end of the piece H; and its lower end is adapted to engage the V-shaped recess $j$ in one arm of the lever J'. It will be noted that both the lever W and the rod Q project through the opening C into the cavity of the casing proper.

A hand-hole covered by a plate U is provided in one side of the valve-casing, allowing access to the space above the valve F, and a similar opening is made into the space between the valves E and F, it being provided with a cover U'.

The operation of my device is as follows: Under normal conditions the various parts of the valve are in the positions shown in Fig. 1, being held there by the air-pressure in the section with which the opening B' communicates pressing against the valve F. It will be understood that the water-pressure in the section B is transmitted from the valve E through the lever W, which acts as a strut or compression-piece, to the arm or lever P, giving it a tendency to rotate about the shaft M. This tendency is resisted and the valve E is kept closed by the trigger edge $j'$ of the lever J' engaging the hooked end $p$ of the lever P. The pull or tendency of the lever J' to rotate in the bearings I I is transmitted to the rod Q, which is kept from rising by the air-pressure against the valve F, transmitted through the piece H. It will be understood that the levers of the valve are so designed that there is a constant ratio between the pressure in the section B and the pressure acting against the valve I', which is required to be exerted against the valve F to keep the said valve seated—e. g., five pounds in the chamber B' in a valve designed with a ratio of ten to one will hold the valve F closed against a pressure of fifty pounds in the chamber B. If now from any cause the pressure in the section with which B' communicates falls below the point predetermined, (in the above case five pounds,) the pressure against the lever J' causes the valve F to be forced off its seat. This immediately releases the hooked end of the arm or lever P from the bearing edge $j'$, and the said lever with the adjusting-screw S swings outwardly, thereby releasing the end of the lever W and being stopped by contact with the cord $x$. The weight X, aided by the water-pressure in the section communicating with the opening B, now causes the lever W to swing forcibly on the shaft V, and the piece Q, being hung on the lever W, passes with it out through the opening C, allowing the valve E to seat itself on the seat $c$, thus closing the opening C. At this time the various parts of the mechanism have assumed the positions shown in Fig. 2, and the water now has a clear passage past the valve E, through the valve F to the section B', and into the sprinkling-pipes of the system. After use the water is shut off and the system is thoroughly drained by petcocks, (not shown,) after which the valve F being shut by gravity the operating air-pressure is admitted to the system of piping in connection with the section B'. The upper part of the casing above the valve F is kept filled with water under normal conditions, the same acting as a seal for said valve and being subjected to the air-pressure in the sprinkler system. The various levers and rods having been returned to the positions shown in Fig. 1, water is now admitted to the section B and the device is again ready for operation.

Should there be any lost motion in the above-described mechanism which might give rise to uncertainty of action or cause leakage of the valves, such could be taken up by the adjusting-screw S, the same being operated by a suitable wrench.

I claim as my invention—

1. The combination of a hollow casing having two outlets, a third outlet and a valve-seat therein, two valve-seats within the casing, two valves constructed to fit the same, one of said valves being pivoted to the casing and arranged to swing so that it may also fit the valve-seat in the third outlet of the casing, with means for operatively connecting the said two valves, substantially as described.

2. In a water-controlling device for a dry-pipe fire-extinguishing system, the combination of a casing, three chambers therein, one chamber having an opening to the outside of the casing, a valve-seat in said opening and passage-ways from said chamber to each of the other chambers, valve-seats in each passage, a valve pivoted to the casing and normally held seated by air-pressure, a second valve also pivoted to the casing and constructed to fit the seat in said opening in the casing, as well as a valve-seat in one of the passages, and mechanism connecting the valves whereby air-pressure in one chamber acting against one of said valves, keeps the second valve closed against water-pressure acting on the said valve in the other chamber, substantially as described.

3. The combination in a water-controlling device of the character described, of a casing, chambers therein, valve-seats and valves between said chambers, openings into each of said chambers, a valve-seat in one of said openings, one of said valves being hinged to fit two of the valve-seats, and levers connecting the valves whereby pressure on one valve keeps the other closed, substantially as described.

4. The combination of a casing, chambers therein, valves between the chambers, two levers forming part of a connection between the valves, said levers being normally in engagement with one another and rods forming struts extending through an opening into the casing and engaging the said levers and the valves, whereby motion of one of the valves normally permits motion of the other, substantially as described.

5. The combination of a hollow casing having three openings thereinto, of a valve-seat in one of said openings, two other valve-seats in the casing, two valves constructed to fit said seats, one of said valves being also adapted to close the said valve-seated opening, struts normally in engagement with said valves and two levers pivoted to the casing and serving with the said struts to operatively connect the valves, substantially as described.

6. The combination of a casing, two valves therein and normally connected thereto, a compression-lever connected to one of said valves, a lever attached to the casing, one arm thereof engaging said compression-lever, the second arm having a hooked end and a second lever supported by the casing, a bearing edge thereon adapted to engage with the hooked arm of the first lever and a rod between the other arm of the second lever and the second of the valves, substantially as described.

7. The combination of a hollow casing having three openings into it, two valves in the casing, levers forming part of a connection between said valves and engaging one another, said levers being supported by, but outside of said casing, rods forming the balance of the connection between the valves, the said rods extending into the casing through one of the openings in the same, substantially as described.

8. The combination of a casing, three chambers therein, an opening into each chamber, valves and valve-seats between each of two of the chambers and the third, a valve-seat in the opening into the third chamber, said valves being pivotally connected to said casing, one of them being constructed to fit either the seat in the third opening or one of the seats in the chambers, two levers pivoted to the outside of the casing, and rods normally extending through the valve-seated opening into the casing and engaging the valves in their closed position, the whole being so arranged that pressure on one of the valves prevents the other from opening, substantially as described.

9. The combination in an automatic-valve mechanism of the character described, of a casing, valves and valve-seats therein, a rod forming a strut pivoted to one valve and pivotally supported on the casing, a second strut loosely pivoted to the first strut and normally in engagement with the second valve, and levers operatively connecting the two struts, the whole constructed to operate when pressure on one of the valves is diminished, substantially as described.

10. The combination in a valve of the character described, of a casing, valves and valve-seats therein, struts pivotally attached to said valves, one of said struts being also pivoted to the casing, two levers pivotally supported on the casing, one of them engaging one of the struts and a third strut normally extending between the second lever and the second pivoted strut, substantially as described.

11. The combination in an automatic-valve mechanism of the character described, of a casing, valves therein, mechanism including levers connecting said valves, and a weight attached to said mechanism whereby the operation of one of the valves is assisted, said weight being constructed to limit the motion of the levers when the valve is operated, substantially as described.

12. The combination in an automatic-valve mechanism of the character described, of a casing, valves therein, struts and levers normally connecting said valves, a weight attached to one of said struts by means of a flexible connection, said connection being adjacent to one of said levers and so placed as to limit the motion of the lever when the mechanism is operated, substantially as described.

In testimony whereof I have signed my name to this specification in the presence of two subscribing witnesses.

POWELL EVANS.

Witnesses:
WILLIAM E. BRADLEY,
JOS. H. KLEIN.